(No Model.)
A. UNIACK.
CRUST SUPPORTER FOR POT PIE PANS.
No. 503,756. Patented Aug. 22, 1893.
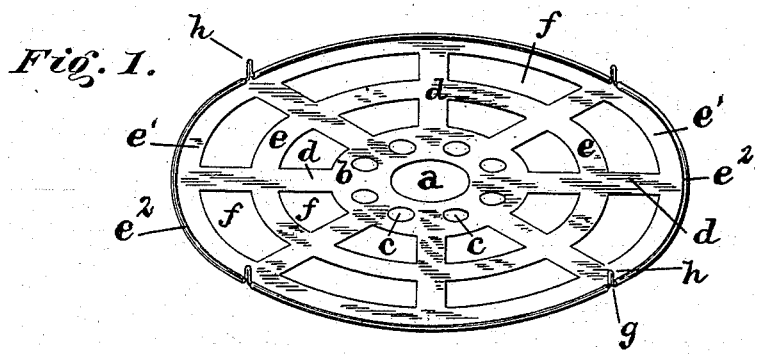
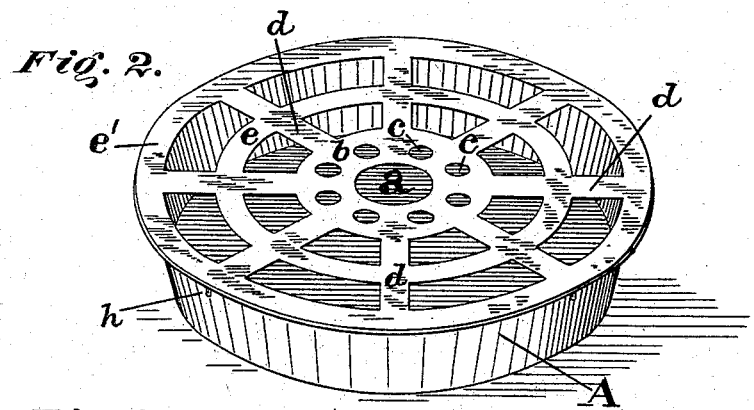
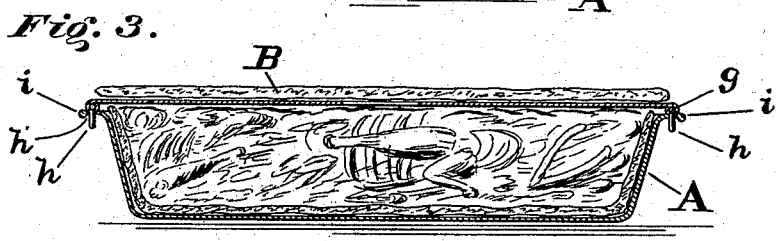
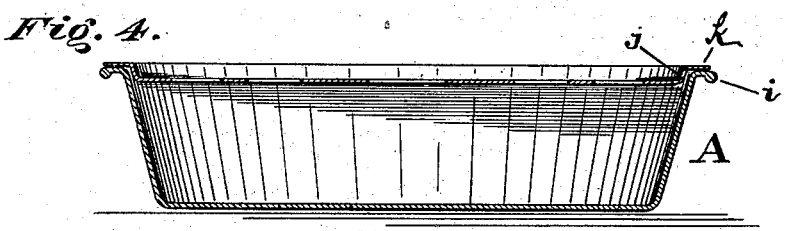
Witnesses
A. O. Babendreier
A. C. Eader
Inventor
Annie Uniack
By Attorney
Chas. B. Mann

UNITED STATES PATENT OFFICE.

ANNIE UNIACK, OF BALTIMORE, MARYLAND.

CRUST-SUPPORTER FOR POT-PIE PANS.

SPECIFICATION forming part of Letters Patent No. 503,756, dated August 22, 1893.

Application filed December 31, 1892. Serial No. 456,894. (No model.)

*To all whom it may concern:*

Be it known that I, ANNIE UNIACK, a citizen of the United States, residing at Baltimore city, in the State of Maryland, have invented certain new and useful Improvements in Crust-Supporters for Pot-Pie Pans, of which the following is a specification.

The object of this invention is to provide a bake-pan with a support for sustaining a top-crust over the contents of the pan.

The problem of how to sustain the top-crust of a pot-pie while baking the same has been a source of considerable annoyance to cooks, and hence I have been led to devise a support which is readily applicable to an ordinary pan and serves to sustain the crust, and yet does not prevent the impregnation of the crust with the vapors arising from the contents of the pan.

The accompanying drawings illustrate the invention.

Figure 1 shows a perspective view of the crust-supporter turned bottom upward. Fig. 2 shows a perspective view of a bake-pan with the crust-supporter fitted thereto. Fig. 3 shows a cross-section of a pan having the crust-supporter with the filling of a pie represented in the pan and a top-crust represented on the supporter. Fig. 4 shows a cross-section of a modified construction.

In carrying out my invention I take a piece of sheet-metal and give it a circular shape with a center opening, $a$, and a circular portion, $b$, of the sheet-metal around said opening, and provided with a series of apertures, $c$; arms $d$, radiate from the center-piece, $b$, and concentric rings, $e, e'$, of the sheet-metal connect said arms thus forming open spaces, $f$, all around between the radiating arms and the concentric rings. The outer edge, $e^2$, of the outside ring, $e'$, is turned over upon a wire, $g$, which extends entirely around the said ring and is formed at intervals into projecting prongs, $h$, standing at right angles to the sheet-metal surface. This sheet-metal piece formed in the manner described constitutes a spider-like or skeleton support, which is adapted to rest on the top-flange, $i$, of an ordinary bake-pan A, and extends completely over the said pan. The top-flange, $i$, of the pan has holes, $h'$, one for each of the prongs, $h$, on the skeleton support, and when these prongs are engaging said holes the said support is prevented from shifting laterally on the pan.

Fig. 4 shows a modified construction in which the holes in the flange of the pan and the prongs on the skeleton support are dispensed with and the said support is made with an annular shoulder, $j$, which drops down into the pan, A, and engages the sides thereof to prevent the shifting of the support. The latter also has an outward extending annular flange, $k$, resting on the flange of the pan.

The application of my invention will now be explained. Ordinarily in making a pot-pie, for example, the bake-pan is first lined on the bottom and sides with pastry to form the under crust, and the filling is then put in, and a top-crust laid over the same. But as there is nothing to sustain this top-crust it will sag down and become soaked by the liquid in the pan so that it will not brown, and the result is therefore unsatisfactory.

With my improvement the pie will be filled as usual and then the skeleton or spider-like support will be fitted over the pan and the top-crust, E, will be spread over this skeleton support which will sustain it over the filling and hence allow it to be browned all over. At the same time the openings in said support allow the vapors from the filling to pass up into the top-crust and flavor it, so that the toothsomeness of the pie is not deteriorated.

Another advantage of my invention is found in serving the pie, for by means of the skeleton support the top-crust can be lifted off bodily and cut separately, while the filling of the pie is dished out.

It is evident that other means than those here shown might be employed to prevent the skeleton support from shifting.

Having thus described my invention, what I claim as new, and desire to secure by Letters Patent, is—

1. The combination with a bake-pan, of a spider-like or skeleton support for a top-crust, said support extending over the pan and provided with means to prevent it from shifting laterally.

2. The combination with a bake-pan having a flange around its top-rim and a number of openings in said flange, of a spider-like or skeleton support resting on the said top-flange of the pan and provided with prongs which engage the openings in said flange.

In testimony whereof I affix my signature in the presence of two witnesses.

ANNIE UNIACK.

Witnesses:
   CHAS. B. MANN,
   A. C. EADER.